United States Patent
Kumar et al.

(10) Patent No.: US 12,513,234 B2
(45) Date of Patent: Dec. 30, 2025

(54) DYNAMIC ATTRIBUTE DRIVEN MOBILE DEVICE CONTENT DELIVERY

(71) Applicant: T-Mobile Innovations LLC, Overland Park, KS (US)

(72) Inventors: Arun Kumar, Overland Park, KS (US); Ryan C. Lindstrom, De Soto, KS (US); Peter K. Mwangi, Overland Park, KS (US); Beth D. Webb, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 316 days.

(21) Appl. No.: 18/459,005

(22) Filed: Aug. 30, 2023

(65) Prior Publication Data
US 2025/0080636 A1    Mar. 6, 2025

(51) Int. Cl.
*H04M 1/72406*    (2021.01)

(52) U.S. Cl.
CPC ............... *H04M 1/72406* (2021.01)

(58) Field of Classification Search
CPC ..... H04M 1/72406; H04W 4/00; H04W 4/14; H04W 4/60; H04W 8/18; H04W 4/16; H04W 4/21; H04W 4/50; H04W 8/26; H04W 12/35; H04W 84/12; H04W 12/04; H04W 28/14; H04W 4/06; H04W 4/12; H04W 88/02; H04W 88/06; H04W 12/03; H04W 12/0431; H04W 12/069; H04W 12/08; H04W 12/12; H04W 12/125; H04W 12/76; H04W 4/24; H04W 48/08; H04W 8/20; H04W 8/245; H04W 12/10; H04W 12/128; H04W 4/02; H04W 4/18; H04W 48/18; H04W 8/22; H04W 84/042; H04W 88/04; H04W 88/08
See application file for complete search history.

(56) References Cited

U.S. PATENT DOCUMENTS

| | | | |
|---|---|---|---|
| 2010/0262958 A1* | 10/2010 | Clinton | G06F 8/65 717/171 |
| 2013/0210494 A1* | 8/2013 | Jouin | G06F 3/04883 455/566 |
| 2016/0335138 A1* | 11/2016 | Surti | G06F 9/44526 |

\* cited by examiner

*Primary Examiner* — Christopher M Brandt

(57) ABSTRACT

A method of providing media content to a communication device. The method comprises retrieving subscriber attributes by a media content provider application from a subscriber database; creating a manifest of media content artifacts by the media content provider application based on identifying alignment between at least some of the media content artifacts, attributes of the communication device, and the subscriber attributes, wherein the manifest of media content artifacts identifies a list of selected media content artifacts along with a location from which the communication device can retrieve the selected media content artifacts and identifies a retrieval priority of each of the selected media content artifacts; and sending the manifest by the media content provider application to the communication device, whereby the communication device is enabled to retrieve the selected media content artifacts in a prioritized manner and install some of the selected media content artifacts in the communication device.

20 Claims, 11 Drawing Sheets

DYNAMIC ATTRIBUTE DRIVEN MOBILE DEVICE CONTENT DELIVERY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices include displays that range from simple to sophisticated displays. Some displays provide very high resolution, while other displays provide medium resolution or even coarse resolution. Likewise, mobile communication devices may be configured with a range of different processors ranging from low processing capacity to high processing capacity. Wireless communication service providers commonly promulgate media content to mobile communication devices, for example to provide sophisticated and engaging user interfaces. Given the range of hardware capability of different mobile communication devices, it is desirable to provide different versions of the same or similar media content for distribution to different mobile communication devices.

SUMMARY

In an embodiment, a method of providing a media content package to a communication device is disclosed. The method comprises creating a library of media content artifacts, wherein the media content artifacts comprise applications, display wallpapers, favorites shortcuts and wherein each media content artifact in the library of media content artifacts is associated with a list of attributes. The method further comprises receiving a request for media content by a media content provider application executing on a computer system from the communication device, wherein the request comprises device attributes and retrieving subscriber attributes by the media content provider application from a subscriber database, wherein the subscriber attributes comprise communication service plan attributes associated with the subscriber of the communication device and demographic attributes associated with the subscriber of the communication device. The method further comprises creating a manifest of media content artifacts by the media content provider application based on identifying alignment between at least some of the media content artifacts and the subscriber attributes and the device attributes, wherein the manifest of media content artifacts identifies a list of selected media content artifacts along with a location from which the communication device can retrieve the selected media content artifacts and identifies a retrieval priority of each of the selected media content artifacts and sending the manifest of media content artifacts by the media content provider application to the communication device, whereby the communication device is enabled to retrieve the selected media content artifacts in a prioritized manner and install at least some of the selected media content artifacts in the communication device.

In another embodiment, a mobile communication device is disclosed. The device comprises a processor, a non-transitory memory, a radio transceiver, a display, and a media content client application stored in the non-transitory memory. When executed by the processor, the media content client application sends a request for media content to a media content service via the radio transceiver and receives a manifest of media content artifacts via the radio transceiver from the media content service, wherein the manifest of media content artifacts identifies a plurality of media content artifacts, locations at which to retrieve each of the plurality of media content artifacts, and a priority associated with each of the plurality of media content artifacts. When executed by the processor, the media content client application also, for each of the plurality of media content artifacts, attempts to retrieve one of the plurality of media content artifacts based on a retry schedule defined by the priority associated with the one of the plurality of media content artifacts and installs at least some of the plurality of media content artifacts into the non-transitory memory, whereby the processor presents media content on the display.

In yet another embodiment, a method of providing a media content package to a communication device is disclosed. The method comprises storing a first plurality of media content artifacts associated with a first content provider in a first partition in a storage facility and storing a second plurality of media content artifacts associated with a second content provider in a second partition in the storage facility, wherein the first plurality and the second plurality of media content artifacts comprise applications, display wallpapers, and favorites shortcuts and wherein each media content artifact is associated with a list of attributes. The method further comprises receiving a request for media content by a media content provider application executing on a computer system from the communication device, wherein the request comprises device attributes and retrieving subscriber attributes by the media content provider application from a subscriber database, wherein the subscriber attributes comprise communication service plan attributes associated with the subscriber of the communication device and demographic attributes associated with the subscriber of the communication device. The method further comprises creating a manifest of media content artifacts by the media content provider application based on identifying alignment between at least some of the attributes associated with the first and second plurality of media content artifacts and the subscriber attributes and the device attributes, wherein the manifest of media content artifacts identifies a list of selected media content artifacts along with a location in either the first partition or the second partition of the storage facility from which the communication device can retrieve the selected media content artifacts and identifies a retrieval priority of each of the selected media content artifacts and sending the manifest of media content artifacts by the media content provider application to the communication device, whereby the communication device is enabled to retrieve the selected media content artifacts in a prioritized manner and install at least some of the selected media content artifacts in the communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
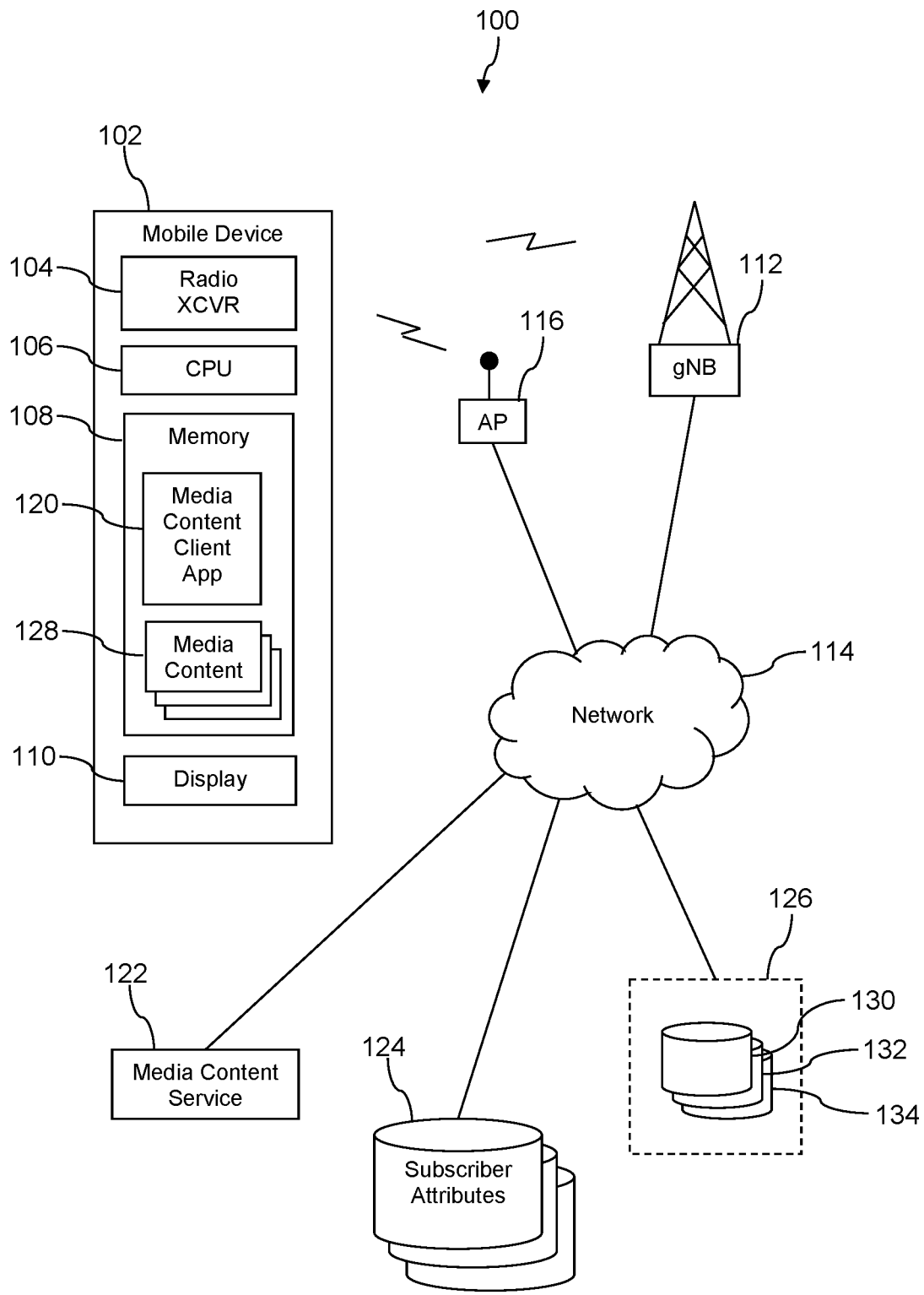
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile communication service providers promulgate media content to mobile communication devices of subscribers. The media content may be sent to the mobile communication devices during an initial activation of a device and at periodic intervals after device activation to provide updated media content to the device. It will be appreciated that the mobile communication service provider may be distributing media content to tens of millions of subscriber mobile communication devices.

Media content may include one or more applications, a display wallpaper, one or more ring tones, one or more power-on videos, one or more power-off videos, and/or one or more set of favorites (e.g., an Internet browser favorites file). Said in other words, the media content may provide all or at least a portion of a user interface (UI) of the mobile communication device. In an embodiment, the media content may comprise designations of layouts and/or placement of applications are placed on the mobile communication device (e.g., screen locations and/or folder location of applications). In an embodiment, the media content may include some items which may not be restricted to the UI of the mobile communication device, for example one or more applications can be included in media content. In an embodiment, the media content may comprise mobile communication device initial settings, such as cellular communication initial settings, Wi-Fi communication initial settings, Bluetooth initial settings, or other common initial settings. In an embodiment, the media content may comprise SIM lock rules or eSIM lock rules relating to what SIMs or eSIM profiles are allowed or are not allowed on the mobile communication device. In an embodiment, the media content may comprise mobile communication device owner management solutions and/or mobile communication device management solutions.

The aggregation of media content installed and presented on a mobile communication device may be referred to as a user experience or as promoting a user experience. It is desirable that the media content be pleasing to the generality of subscribers. Because different subscribers have different aesthetic preferences, have different preferences for applications, and have different levels of technical sophistication, it is desirable to try to distribute different media content to different subscribers.

In the past, media content may have been promulgated in a media content pack or media content bundle that included all the various items of media content that were being installed on a given mobile communication device. A disadvantage of this approach was that a transmission error might foil the entire transmission attempt, leading to a retry from the beginning. Additionally, because the media content pack was inherently large, the probability of a transmission error occurring sometime during the transmission was correspondingly large.

The present disclosure teaches a new system and method of promulgating media content. The new approach involves sending the media content to the device one media content artifact at a time, as a series of separate transmissions. In this way, each transmission of a media content artifact is relatively small (relative to the former media content pack comprising a plurality of media content artifacts) and hence less likely to experience a data transmission error. Additionally, when a data transmission error does occur for a given media content artifact, the retransmission involves a smaller amount of data (e.g., a single media content artifact rather than a plurality of media content artifacts). As used herein, the term 'media content artifact' refers to the item of data and/or instructions that is processed by a processor of a mobile communication device to present media content on the device (presenting graphic images on a display or audio via a speaker of the device). The term 'media content' used herein may refer to what the user of the mobile communication device experiences (what the user sees and/or hears) or may refer to one or more media content artifacts. Where the distinction between what the user experiences and the data/instructions that enable that user experience is desired, the term 'media content artifact' will be employed.

In an embodiment, a media content system involves a media content service and a media content artifact storage facility. Media content artifacts may be identified and indexed by attributes in an inventory and rules data store in the media content service. The media content artifacts themselves may be stored in the media content artifact storage facility. Different versions of a given type of media content artifact, for example different versions of display wallpaper artifacts, may be deployed for promulgation to different devices (e.g., devices having different display capabilities—different sizes, different numbers of pixels, etc.). A given specific instance of a media content artifact may be indexed with a plurality of attributes that are associated with that instance of the media content artifact. The attributes may be related to a hardware capability of a candidate mobile communication device (e.g., display capability and/or processor capability). The attributes may be related to subscriber attributes (e.g., age category, interest category, service plan, etc.). An inventory of media content artifacts may be maintained by the media content service in the inventory and rules data store, where each inventory entry identifies a media content artifact, a location of the media content artifact in the media content artifact storage facility, and a list of attributes that are associated with the media content artifact. In an embodiment, the inventory and rules data store does not store the media content artifacts themselves. The inventory and rules data store also comprises rules for selecting specific instances of media content artifacts based on input attributes.

When a mobile communication device desires a media content update (either during device activation or at periodic intervals thereafter), it sends a media content request along with device attributes to the media content service. The device attributes can include a list of device hardware capabilities such as display capabilities (e.g., pixel configuration), memory capabilities (e.g., memory size), and processor capabilities. The device attributes can include identities and versions of already installed media content artifacts. The media content service accesses one or more subscriber data bases to obtain subscriber attributes. These subscriber attributes can include an age category of the subscriber associated with the device, an interest category associated with the subscriber, and a service plan associated with the device. The media content service then searches through the inventory in the inventory and rules data store and attempts to match, following rules stored in the data store, the device and subscriber attributes to the media content artifacts identified in the data store. When the media content service finds matches, it selects the best match to the device based on rules. The media content service eliminates matches where the subject media content artifact is already installed in the device. The media content service then creates a manifest, where each item in the manifest identifies a media content artifact and a location of the media content artifact in the media content artifact storage facility. The manifest may further comprise media content artifact prioritization information. The media content service sends the manifest to the mobile communication device that sent the media content request. In an embodiment, the manifest is a file.

The mobile communication device acts on the manifest by sending media content artifact requests, one-by-one, to the media content artifact storage facility. The device may send the media content artifact requests in a prioritized order specified by the manifest it received from the media content service. For example, media content artifacts deemed to be higher priority may be requested before other media content artifacts deemed to be lower priority. The device may resend media content artifact requests when previous transmissions of the media content artifact failed. In an embodiment, the maximum number of times the device may resend a media content artifact request (e.g., a retry attempt) for a given artifact may be defined by the manifest it received from the media content service. For example, media content artifacts deemed to be higher priority may be associated with a higher maximum number of retries, and media content artifacts deemed to be lower priority may be associated with lower maximum number of retries.

In an embodiment, the media content service may comprise a media content manager component that receives and processes administration requests to create or revise rules and/or inventory entries stored in the media content inventory and rules data store. The administration requests may be received by the media content manager from workstations operated by user experience specialist employees or media content specialist employees of the mobile communication service provider. In an embodiment, the media content service may comprise a media content provider component that receives media content requests from mobile communication devices and returns manifests to the requesting devices. In an embodiment, media content service comprises a rules executor component. The media content provider sends the device attributes, the information about media content attributes already installed on the device, and the subscriber attributes associated with a device media content request to the rules executor, and the rules executor builds the manifest based on the device attributes and subscriber attributes, based on the media content attributes already installed on the device, and based on media content distribution rules stored in the media content inventory and rules data store.

In an embodiment, the media content artifact storage facility may comprise a plurality of different partitions. Media content artifacts that are developed by and/or are owned by different media content providers may be stored in different ones of the partitions of the media content artifact storage facility. For example, media content artifacts associated with a US government agency may be stored in a first partition, media content artifacts associated with a corporation may be stored in a second partition, media content artifacts associated with a marketing department of the mobile communication service provider may be stored in a third partition, and media content artifacts associated with a billing department of the mobile communication service provider may be stored in a fourth partition of the media content artifact storage facility. Segregating media content artifacts in this way may promote enhanced security for the media content artifacts, for example different security policies may be applied to different media content artifacts based on the partition of the media content artifact storage facility they are stored in. Segregating media content artifacts in this way may enable billing different parties for the costs of storing their media content artifacts separately. In an embodiment, the media content artifact storage facility may be deployed in a third-party cloud computing storage facility.

In an embodiment, at least some of the media content may comprise what may be referred to as brand content or branded content. The aggregation of such brand content installed and presented on a mobile communication device may be deemed a brand identity. In some cases, the brand identity may be the brand identity of the mobile communication service provider. In other cases, the brand identity may be the brand identity of a corporation, a government agency, or an organization that has provided the device to an employee.

Turning now to FIG. 1, a system 100 is described. In an embodiment, system 100 comprises a mobile communication device 102 that comprises a radio transceiver 104, a processor 106, a non-transitory memory 108, and a display 110. In an embodiment, the radio transceiver 104 can establish a wireless communication link via a cell site 112 to the network 114 according to a 5G, a long-term evolution (LTE), a code division multiple access (CDMA), or a global system for mobile communication (GSM) telecommunication protocol. In an embodiment, the radio transceiver 104 can establish a wireless communication link via a WiFi access point 116 to the network 114. In an embodiment, the device 102 may have both a cellular radio transceiver and a WiFi radio transceiver and may communicate with the network 114 via either the cell site 112 or the WiFi AP 116. The mobile communication device 102 may be a smart phone, a wearable computer, a headset computer, a laptop computer, a notebook computer, a tablet computer, or another mobile communication device.

Once communicatively linked to the network 114, the device 102 can communicate with other communication endpoints such as other mobile communication devices (e.g., voice calls, SMS messages, MMS messages, etc.), content servers, and/or application servers. It is understood that while FIG. 1 illustrates a single mobile communication device 102, the system described herein is configured to communicate with a great many other mobile communication devices 102. The system 100 comprises any number of devices 102, any number of cell sites 112, and any number of WiFi access points 116. The network 114 comprises one or more public networks, one or more private networks, or a combination of both.

The non-transitory memory 108 of the mobile communication device 102 stores a media content client application 120 that, when executed by the processor 106, can communicate via the radio transceiver 104 to a media content service 122 to request media content artifacts. The media content service 122 can return a manifest of media content artifacts to the media content client application 120. The media content client application 120, based on the manifest of media content artifacts, can reach out to a media content artifact storage facility 126 to retrieve media content artifacts 128 and install these media content artifacts 128 in the non-transitory memory 108 of the mobile communication device 102. When these media content artifacts 128 are installed, the processor 106 can execute the media content artifact 128 and cause the mobile communication device 102 to present media content (e.g., via the display 110 and/or through a speaker of the device 102). It is understood that presenting media content can include executing media content artifacts that are applications (or applets) and presenting a list of favorites in an Internet browser. Presenting media content can include presenting wallpaper on the display 110, presenting a power-on video on the display 110, presenting a power-off video on the display 110, presenting a logo on the display 110, and sounding audio tones (power-on audios, power-off audios, ringtones, notification tones, alarm tones, etc.).

The media content client application 120 may send a media content request that includes information about the media content artifacts 128 already installed in the device 102 and hardware capabilities of the device 102. The media content client application 120 may be configured to send the media content request on activation of the device 102, on a periodic basis specified by the media content service 122, or in response to a notification received from the media content service 122. The information about media content artifacts 128 already installed can include identities and versions of the media content artifacts 128. The information about hardware capabilities of the device 102 can include information about the pixel configuration of the display 110, information about the size of non-transitory memory 108 (e.g., total size and/or available space), and information about the processing capacity of the processor 106. The information about hardware capabilities of the device may include information about specialty processors (e.g., graphics processors and/or application specific integrated circuits (ASICs)) installed in the device 102. The information about hardware capabilities of the device may include identities (brand and model) of one or more microprocessors, graphics processors, and/or ASICs installed in the mobile communication device 102.

The media content service 122 may reach out to one or more subscriber attributes data store 124 maintained by the mobile communication service provider to obtain subscriber attributes such as an age category of the subscriber associated with the mobile communication device 102, an interest category of the subscriber, a home address and/or home zip-code of the subscriber, an educational level of the subscriber, an income level of the subscriber, and a communication subscription service plan of the subscriber. The media content service 122 then generates the manifest of media content artifacts based on device attributes, based on knowledge of what media content artifact and versions are already installed on the device 102, and based on subscriber attributes.

The media content artifact storage facility 126 may be provided in the network domain of the mobile communication service provider. The media content artifact storage facility 126 may be provided by a third-party cloud computing facility as cloud storage. In an embodiment, the media content artifact storage facility 126 segregates storage of media content artifacts into different partitions, for example a first storage partition 130, a second storage partition 132, and a third storage partition 134. It is understood that the media content artifact storage facility 126 may comprise any number of different storage partitions. Storing different media content artifacts in different storage partitions enables defining different policies for accessing artifacts in different storage partitions. Storing different media content artifacts in different storage partitions enables differentiated billing of storage service fees from a third-party cloud computing service provider to media content artifact stakeholders, for example to specific government agencies, to specific corporations, to specific departments within the mobile communication service provider.

Figure 2A:
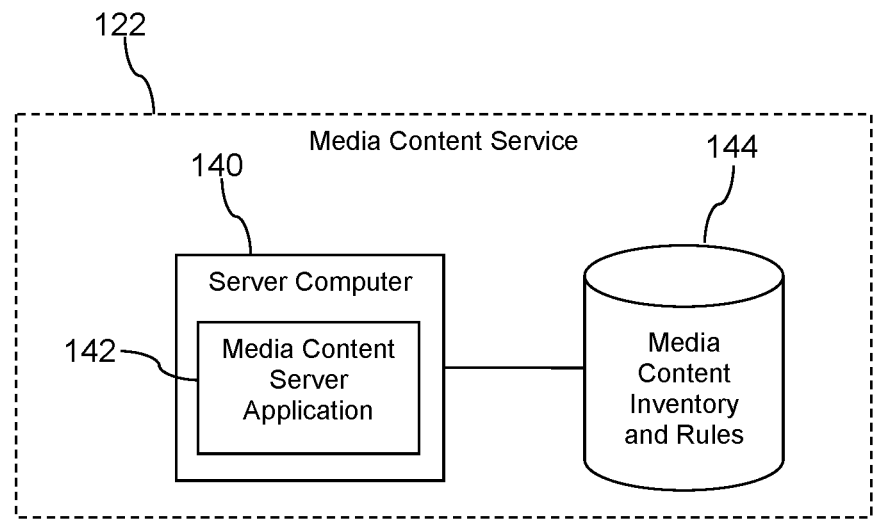
FIG. 2A is a block diagram of a media content service according to an embodiment of the disclosure.

Turning now to FIG. 2A, and with reference still to FIG. 1, further details of the media content service 122 are described. The media content service 122 may be provided by one or more server computers 140 that execute a media content server application 142. Computer systems are described further hereinafter with reference to FIG. 10. The media content server application 142 may receive media content requests from the mobile communication device 102, fetch subscriber attributes from the one or more subscriber attributes data store 124, scan a media content inventory and rules data store 144, and execute rules retrieved from the media content inventory and rules data store 144 to identify what media content artifacts should be downloaded by the device 102 from the media content artifact storage facility 126. The media content server application 142 then generates a manifest and sends this to the mobile communication device 102.

Figure 2B:
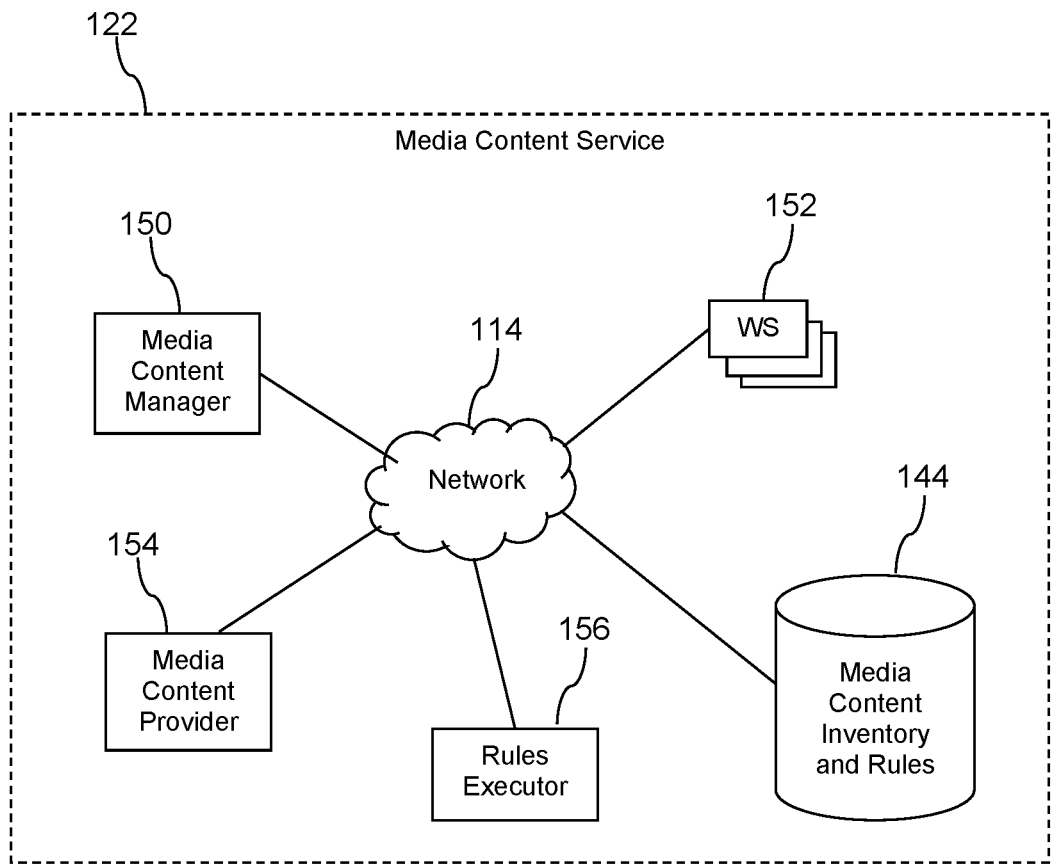
FIG. 2B is a block diagram of another media content service according to an embodiment of the disclosure.

Turning now to FIG. 2B, and with continued reference to FIG. 1 and to FIG. 2A, further details of the media content service 122 are described. In an embodiment, the functionality of the media content server application 142 depicted in FIG. 2 may be provided by separate components including a media content manager 150, a media content provider 154, and a rules executor 156. The media content manager 150 may receive requests from one or more work stations 152 via the network 114 to define identities of media content artifacts stored in the media content artifact storage facility 126, to define locations in the media content artifact storage facility 126 from which to retrieve the media content artifact, to associate attributes to the identities of media content artifacts, to associate priorities to the identities of media content artifacts, and to define rules for providing identities of media content artifacts in manifests to be sent to mobile communication devices 102. The media content manager 150 can then update the media content inventory and rules data store 144 accordingly.

The media content provider 154 receives media content requests from mobile communication devices 102 and returns a manifest indicating what media content artifacts the device 102 should download, where to download the artifacts from, and according to what prioritization the device 102 should download the artifacts. The media content request may provide a variety of device attributes such as a list of media content artifacts and their versions already installed on the mobile communication device 102, information about the display of the device 102, information about the processor of the device 102, and information about the memory of the device 102. The media content provider 154 accesses the one or more subscriber attributes data store 124 to retrieve information about the subscriber associated with the device 102. The subscriber attributes may comprise one or more of an age category of the subscriber, an interest category of the subscriber, a home address and/or zip-code of the subscriber, an educational level of the subscriber, an income level of the subscriber, and a service plan of the subscriber. The media content provider 154 sends the device attributes and subscriber attributes to the rules executor 156.

The rules executor 156 scans the media content inventory and rules data store 144 to identify media content artifacts to be downloaded to the device 102. The rules executor 156 evaluates what media content identities to build into a manifest based on executing rules stored in the media content inventory and rules data store 144. These rules may define under what conditions a given media content artifact identity ought to be included in the manifest. The rules can take into account the compatibility of a given media content artifact and the device attributes. For example, downloading a high definition wallpaper media content artifact to a mobile communication device 102 that has a low resolution display may not be a good choice. For example, downloading an application media content artifact that consumes a large amount of processing cycles to a device 102 that has a low power processor may not be a good choice. Likewise, downloading a low resolution wall paper media content artifact to a device 102 having a high resolution display may not be a good choice either.

The rules executed by the rules executor 156 can take into account the version of a media content artifact currently installed on the device 102 versus the latest version of the media content artifact stored in the media content artifact storage facility 126. The rules may indicate that a device 102 associated with a subscriber having a first subscription service plan should download the latest version of a media content artifact every other version (e.g., download only when 2 revisions behind) while a subscriber having a second subscription service plan should download the latest version of the same media content artifact any time a more up-to-date version is available (e.g., when the subscription plan is associated with a higher grade of service or when the subscription plan is associated with a US government agency). The rules executed by the rules executor 156 can take into account subscriber attributes. For example, the rules may indicate that a device for a first subscriber associated with an older age category should download a first social networking application media content artifact while a device for a second subscriber associated with a younger age category should download a second different social networking application media content artifact. The rules executed by the rules executor 156 can take into account other subscriber attributes to determine what media content identities to include in the manifest, for example a location of the subscriber (e.g., based on a home address and/or a home zip-code), an income category of the subscribe, an education level of the subscriber, etc.

The rules executed by the rules executor 156 can also define a priority associated with media content artifacts. The priorities associated with each different media content artifact identity can include an order in which to request and install each media content artifact in the mobile communication device 102 and a maximum number of retry attempts to be made to download each media content artifact from the media content artifact storage facility 126.

The rules executor 156 creates a manifest that includes identities of media content artifacts, locations of the subject media content artifacts (e.g., the location of the media content artifact storage facility 126; the location of one of the partitions 130, 132 and 134 within the media content artifact storage facility 126; and a location within the subject partition 130, 132 and 134), and a priority definition associated with each identity of media content artifact. The rules executor 156 returns this manifest to the media content provider 154, and the media content provider 154 returns this manifest to the mobile communication device 102. In an embodiment, a load balancer may be disposed between the mobile communication device 102 and the media content provider 154 whereby to balance a processing load on the media content provider 154 among multiple parallel instances of the content provider 154.

It will be appreciated that the media content service 122 described with reference to FIG. 2A is compatible with the media content service 122 described with reference to FIG. 2B. The description of the media content service 122 with reference to FIG. 2B provides a finer granularity abstraction of the media content service 122 compared with FIG. 2A.

Figure 3:
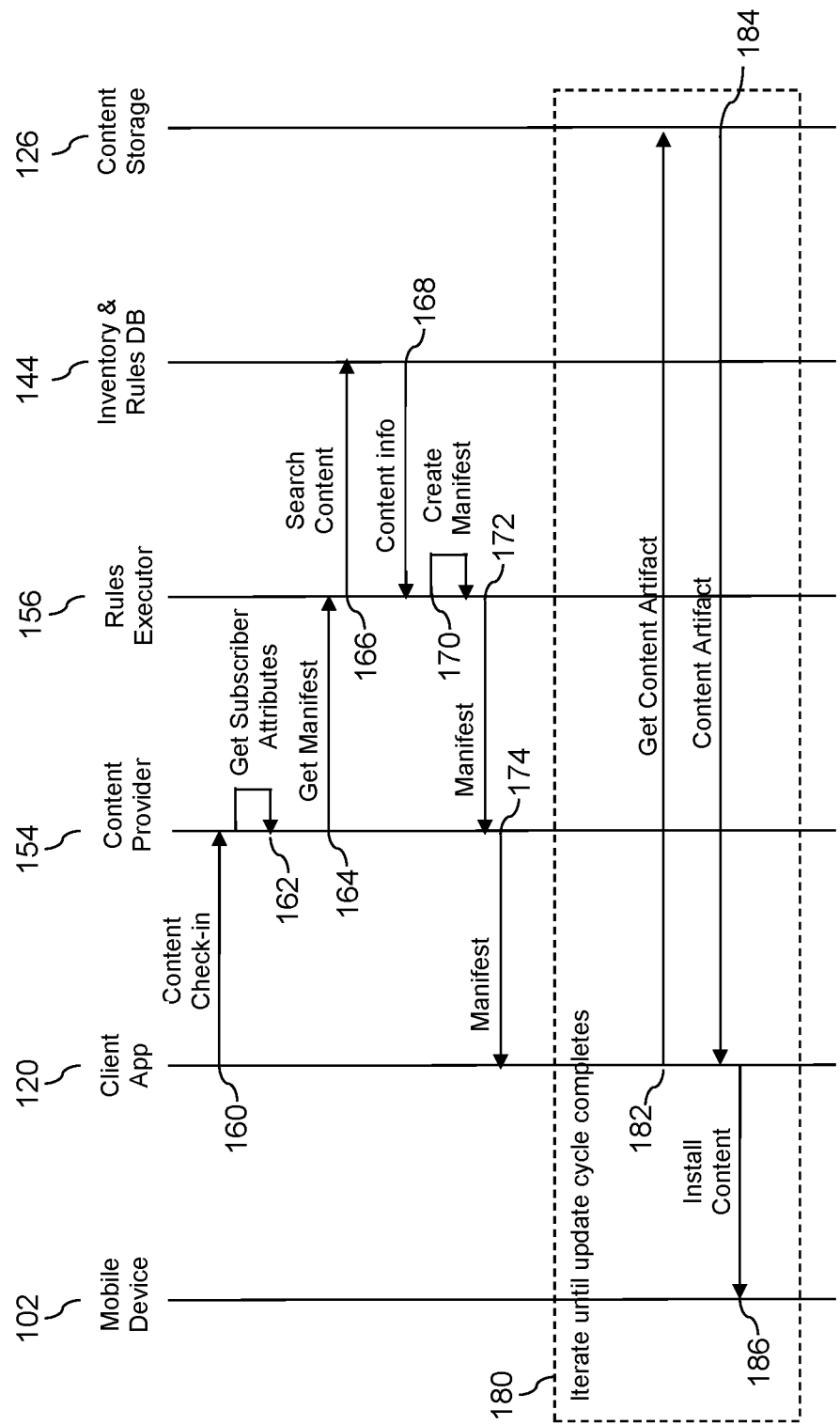
FIG. 3 is a message sequence diagram of a mobile communication device requesting and installing media content according to an embodiment of the disclosure.

Turning now to FIG. 3, a message sequence diagram is described. The media content client application 120 executes on the mobile communication device 102 and sends a media content check-in message 160 to the media content provider 154. The media content client application 120 may send the media content check-in message 160 (also may be referred to as a media content request) on initial activation of the mobile communication device 102, at a period time previously conveyed to the client 120 by the media content provider 154, or in response to a notification received by the client 120 from the media content provider 154. The media content check-in message 160 can include device attributes and information about media content artifacts currently installed in the mobile communication device 102. While in FIG. 3 the mobile communication device 102 is shown as separate from the media content client application 120, it is understood that the media content client application 120 is stored in the non-transitory memory 108 of the device 102 and executes on the processor 106 of the device 102 and is illustrated separately to more particularly point out the activities of the client 120.

In response to receiving the media content check-in message 160 from the client 120, at label 162 the media content provider 154 fetches subscriber attributes from the one or more databases 124. The media content provider 154 sends a media content manifest request message 164 to the rules executor 156. The rules executor at label 166 reaches out to the media content inventory and rules data store 144 and obtains the list of media artifact identities, the attributes associated with the media content artifact identities, and the rules associated with the media content artifact identities. The requested information is returned at label 168 to the rules executor 156. It is understood that the rules executor 156 may make a series of requests to and receive a series of responses from the media content inventory and rules data store 144. In an embodiment, the rules executor 156 accesses the band content inventory and rules data store 144 in a different way.

At label 170, the rules executor 156 analyzes the information and rules retrieved from the media content inventory and rules data store 144 in the context of the device attributes and subscriber attributes received from the media content provider 154 to define a manifest. In an embodiment, the manifest defines one or more identities of media content artifacts, associated location information for each media content artifact identity, and priority information for each media content artifact identity. The rules executor 156 returns the manifest in a message 172 to the media content provider 154. The media content provider returns the manifest in a message 174 to the media content client application 120.

In processing block 180, the media content client application 120 retrieves media content artifacts from the media content artifact storage facility 126, and the mobile communication device 102 installs the media content artifacts in an iterative process, one media content artifact at a time. When an attempt to retrieve a media content artifact fails for some reason, a retry attempt to retrieve the media content artifact may be deferred until later, for example after attempts to retrieve one or more other media content artifacts. The sequence of attempts to download media content artifacts performed by the media content client application 120 may be performed in accord with the prioritization information stored in the manifest. The maximum number of retry attempts the media content client application 120 may perform to retrieve a given media content artifact from the media content artifact storage facility 126 may be based on the prioritization information stored in the manifest.

At label 182, the media content client application 120 sends a media content artifact request to the media content artifact storage facility 126. In an embodiment, the media content artifact request comprises an identify of a media content artifact and a location of the media content artifact (e.g., a location or identity of a partition 130, 132, 134 and a location within a partition, for example a directory name or other identification of a location). At label 184, the media content artifact storage facility 126 returns the requested media content artifact. The media content client application 120 may examine the received media content artifact to assure that the reception of the artifact was successful. This check may be performed using a checksum, using a sequence number of TCP packets received, and/or via some other check of artifact integrity. If the media content artifact was received successfully, the media content client application 120 provides the media content artifact to the mobile communication device and the artifact is installed (e.g., stored in the non-transitory memory 108 and executed by the processor 106). If the media content artifact was not received successfully, the media content client application 120 does not provide the artifact to the device 102 and may later retry fetching the subject media content artifact. While all of the media content artifacts identified in the manifest have not yet been successfully retrieved, the media content client application 120 may reiterate the actions 182, 184, 186 for each of the media content artifact identities included in the manifest.

Figure 4:
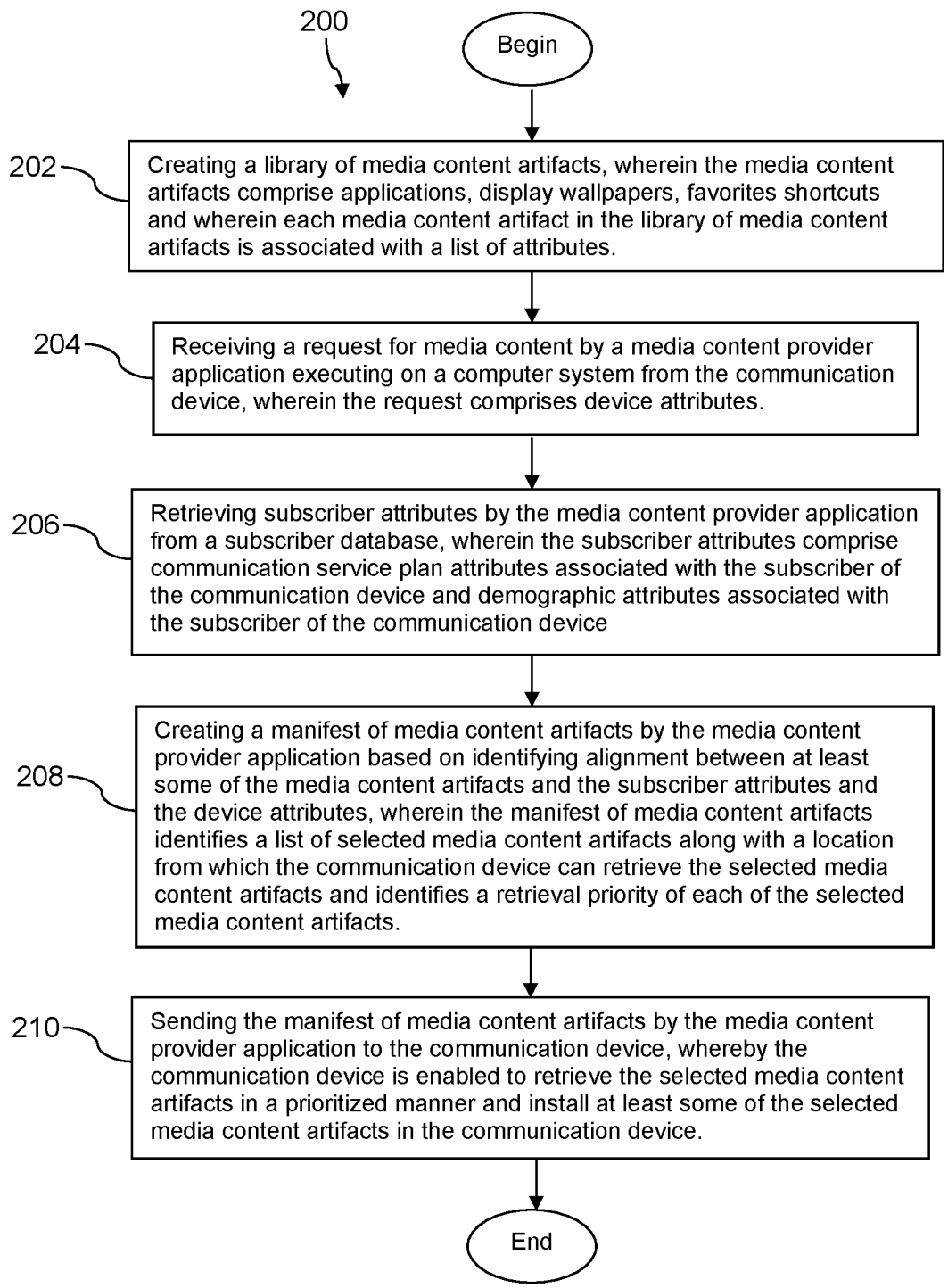
FIG. 4 is a flow chart of a method according to an embodiment of the disclosure.

Turning now to FIG. 4, a method 200 is described. In an embodiment, the method 200 comprises a method of providing a media content package to a communication device. The communication device may be a smart phone, a wearable computer, a headset computer, a laptop computer, a notebook computer, or a tablet computer. At block 202, the method 200 comprises creating a library of media content artifacts, wherein the media content artifacts comprise applications, display wallpapers, favorites shortcuts and wherein each media content artifact in the library of media content artifacts is associated with a list of attributes. The library of media content artifacts may be the media content artifact storage facility 126 described above. The library of media content artifacts may store different media content artifacts in different partitions of the library. In an embodiment, the media content artifacts may comprise mobile communication device initial settings, such as cellular communication initial settings, Wi-Fi communication initial settings, Bluetooth initial settings, or other common initial settings. In an embodiment, the media content artifacts may comprise SIM lock rules or eSIM lock rules relating to what SIMs or eSIM profiles are allowed or are not allowed on the mobile communication device. In an embodiment, the media content artifacts may comprise mobile communication device owner management solutions and/or mobile communication device management solutions.

At block 204, the method 200 comprises receiving a request for media content by a media content provider application executing on a computer system from the communication device, wherein the request comprises device attributes. In an embodiment, the device attributes comprise information about a processor capability of the communication device, a memory capacity of the communication device, and a display capability of the communication device. In an embodiment, the device attributes comprise information about media content artifacts installed on the communication device including identities of the media content artifacts and version identities of the media content artifacts. At block 206, the method 200 comprises retrieving subscriber attributes by the media content provider application from a subscriber database, wherein the subscriber attributes comprise communication service plan attributes associated with the subscriber of the communication device and demographic attributes associated with the subscriber of the communication device. In an embodiment, the demographic attributes associated with the subscriber of the communication device comprise an age category of the subscriber and an interest category of the subscriber. In an embodiment, the demographic attributes associated with the subscriber of the communication device comprise information about a residence location of the subscriber.

At block 208, the method 200 comprises creating a manifest of media content artifacts by the media content provider application based on identifying alignment between at least some of the media content artifacts and the subscriber attributes and the device attributes, wherein the manifest of media content artifacts identifies a list of selected media content artifacts along with a location from which the communication device can retrieve the selected media content artifacts and identifies a retrieval priority of each of the selected media content artifacts. In an embodiment, the location from which the communication device can retrieve the selected media content artifacts includes a partition within the library of media content artifacts. In an embodiment, the retrieval priority identified by the manifest indicates a different maximum number of retry attempts for different ones of the media content artifacts identified in the manifest. At block 210, the method 200 comprises sending the manifest of media content artifacts by the media content provider application to the communication device, whereby the communication device is enabled to retrieve the selected media content artifacts in a prioritized manner and install at least some of the selected media content artifacts in the communication device.

Figure 5:
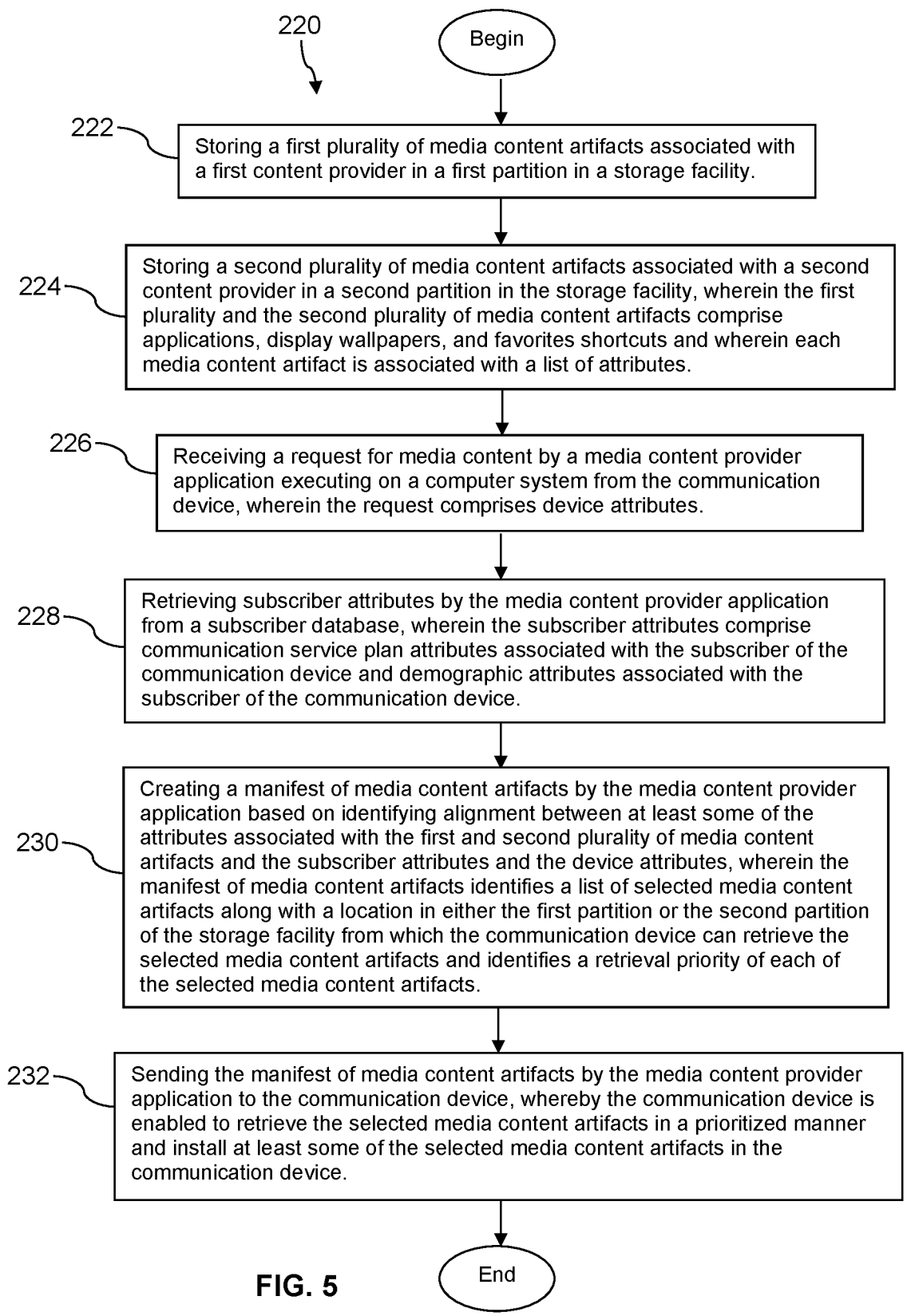
FIG. 5 is a flow chart of another method according to an embodiment of the disclosure.

Turning now to FIG. 5, a method 220 is described. In an embodiment, the method 220 is a method of providing a media content package to a communication device. In an embodiment, the communication device is a smart phone, a wearable computer, a headset computer, a laptop computer, a notebook computer, or a tablet computer. At block 222, the method 220 comprises storing a first plurality of media content artifacts associated with a first content provider in a first partition in a storage facility. At block 224, the method 220 comprises storing a second plurality of media content artifacts associated with a second content provider in a second partition in the storage facility, wherein the first plurality and the second plurality of media content artifacts comprise applications, display wallpapers, and favorites shortcuts and wherein each media content artifact is associated with a list of attributes. In an embodiment, the media content artifacts comprise ring tones, power-on videos, power-off videos, and logos. In an embodiment, the media content artifacts may comprise mobile communication device initial settings, such as cellular communication initial settings, Wi-Fi communication initial settings, Bluetooth initial settings, or other common initial settings. In an embodiment, the media content artifacts may comprise SIM lock rules or eSIM lock rules relating to what SIMs or eSIM profiles are allowed or are not allowed on the mobile communication device. In an embodiment, the media content artifacts may comprise mobile communication device owner management solutions and/or mobile communication device management solutions. At block 226, the method 220 comprises receiving a request for media content by a media content provider application executing on a computer system from the communication device, wherein the request comprises device attributes.

At block 228, the method 220 comprises retrieving subscriber attributes by the media content provider application from a subscriber database, wherein the subscriber attributes comprise communication service plan attributes associated with the subscriber of the communication device and demographic attributes associated with the subscriber of the communication device. At block 230, the method 220 comprises creating a manifest of media content artifacts by the media content provider application based on identifying alignment between at least some of the attributes associated with the first and second plurality of media content artifacts and the subscriber attributes and the device attributes, wherein the manifest of media content artifacts identifies a list of selected media content artifacts along with a location in either the first partition or the second partition of the storage facility from which the communication device can retrieve the selected media content artifacts and identifies a retrieval priority of each of the selected media content artifacts.

In an embodiment, a rules executor application executing on the computer system defines the manifest of media content artifacts based on the device attributes and based on the subscriber attributes and based on rules defined within a media content service and provides the manifest to the media content provider application, wherein the media content provider application and the rules executor application are part of the media content service. In an embodiment, the media content service comprises a media content inventory and rules data store that stores identities of media content artifacts, wherein each identity of a media content artifact is associated with a location of a corresponding media content artifact in the storage facility, with a retrieval priority associated with downloading the corresponding media content artifact, and with a rule to be executed by the rules executor application. In an embodiment, the method 220 comprises storing identities of media content artifacts, attributes associated to the identities of media content artifacts, retrieval priorities associated to the identities of media content artifacts, and rules associated to the identities of media content artifacts in the media content inventory and rules data store by a media content manager application executing on the computer system.

At block 232, the method 220 comprises sending the manifest of media content artifacts by the media content provider application to the communication device, whereby the communication device is enabled to retrieve the selected media content artifacts in a prioritized manner and install at least some of the selected media content artifacts in the communication device.

Figure 6:
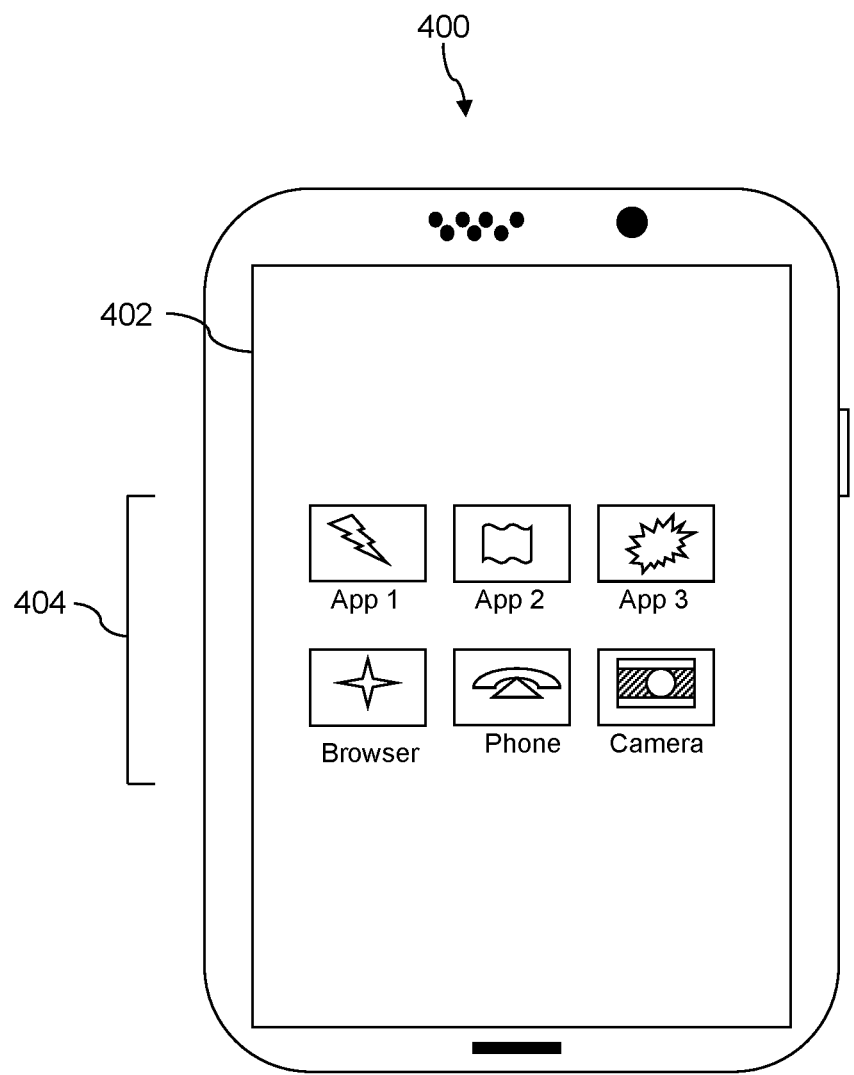
FIG. 6 is an illustration of a mobile communication device according to an embodiment of the disclosure.

FIG. 6 depicts the user equipment (UE) 400, which is operable for implementing aspects of the present disclosure, but the present disclosure should not be limited to these implementations. For example, the UE 400 may be used to implement some instances of the mobile communication device 102 described above. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. Some of the application icons 404 may be applications installed as media content artifacts on the UE 400.

The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
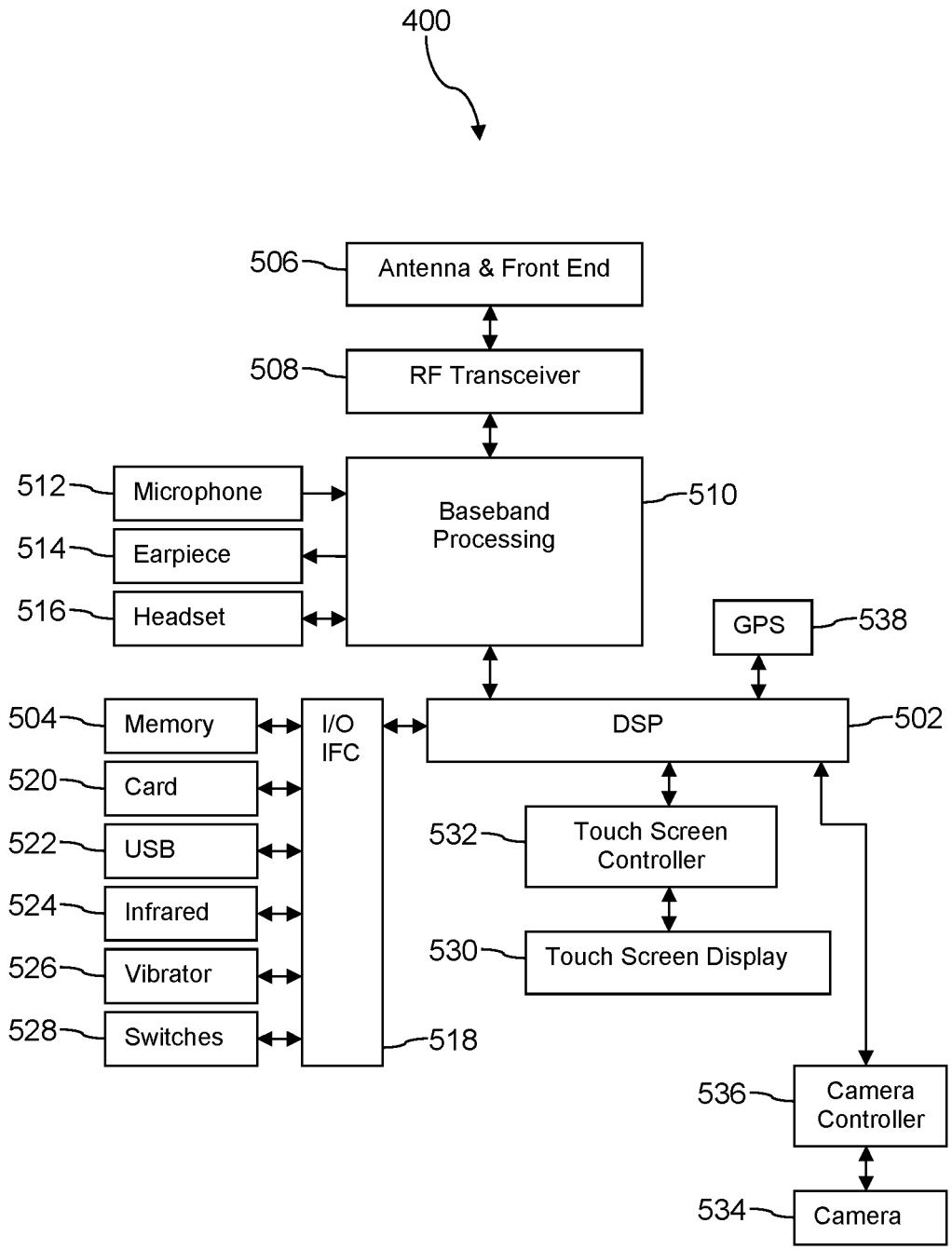
FIG. 7 is a block diagram of a hardware architecture of a mobile communication device according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long-term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
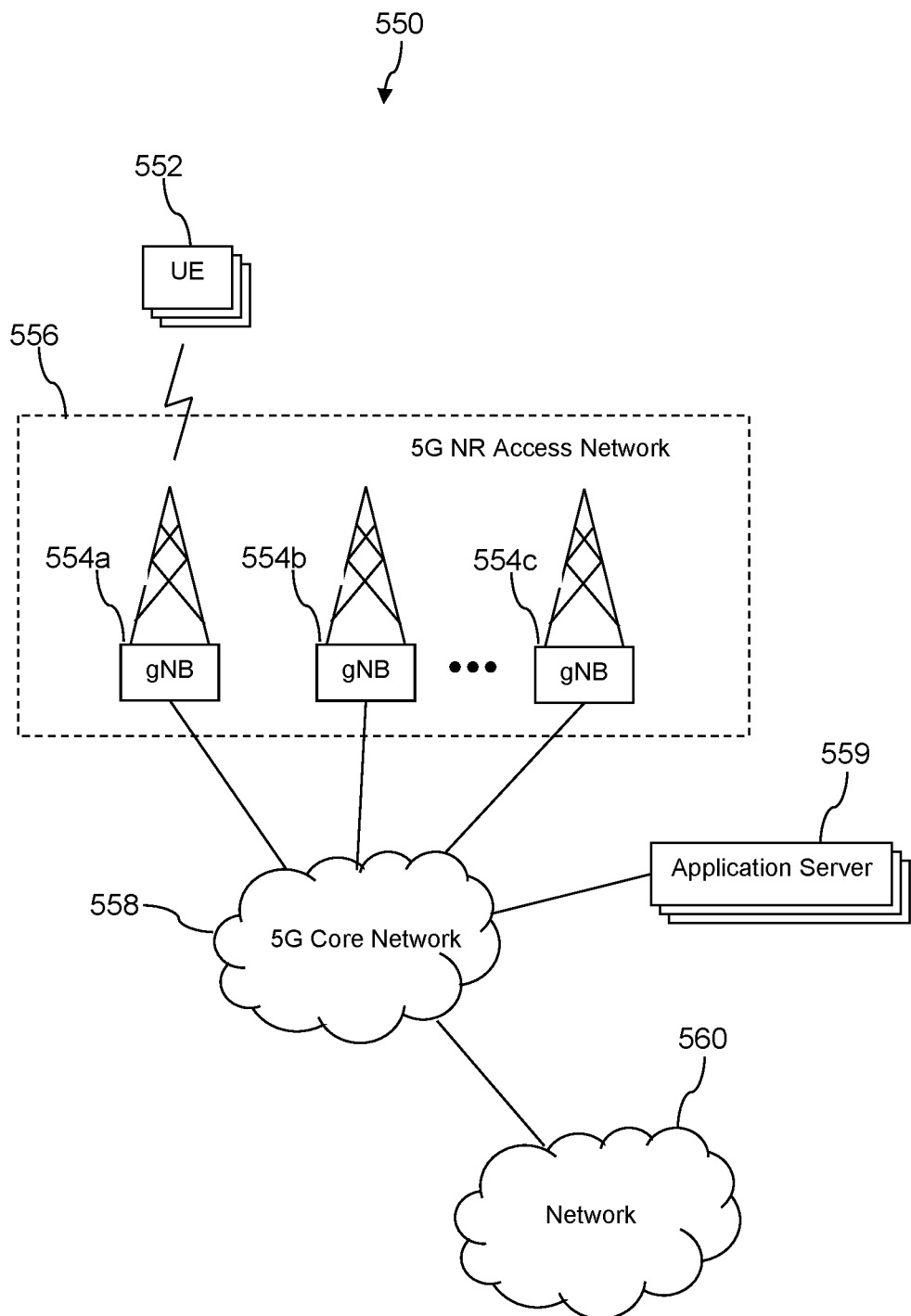
FIG. 8A and FIG. 8B is an illustration of a 5G network according to an embodiment of the disclosure.

Turning now to FIG. 8A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 8B:
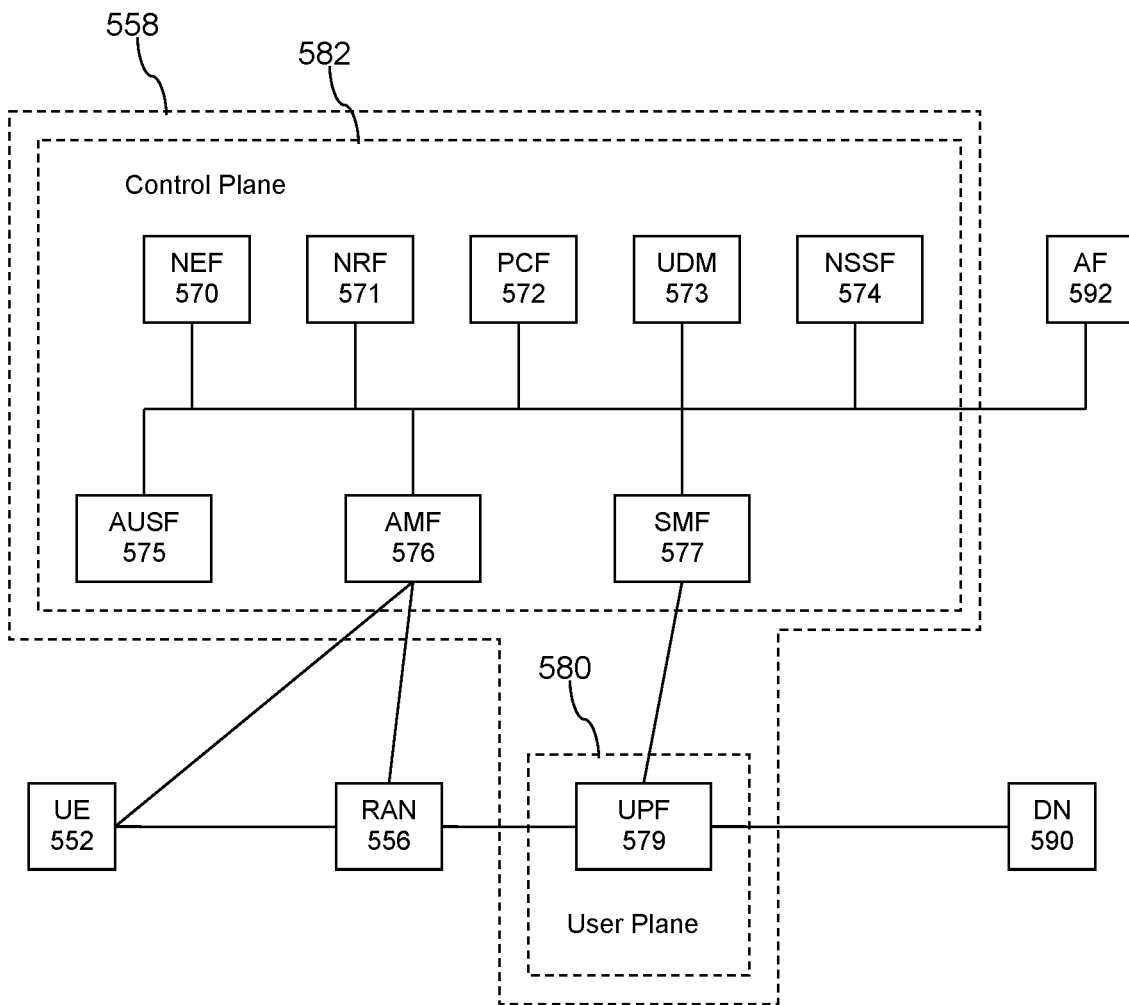

Turning now to FIG. 8B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 9A:
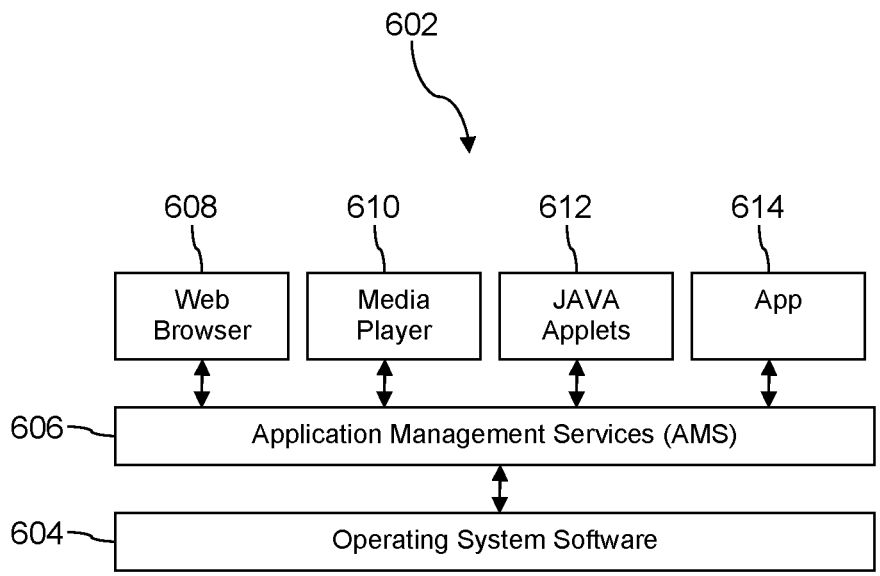
FIG. 9A is a block diagram of a software architecture according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 9A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 9B:
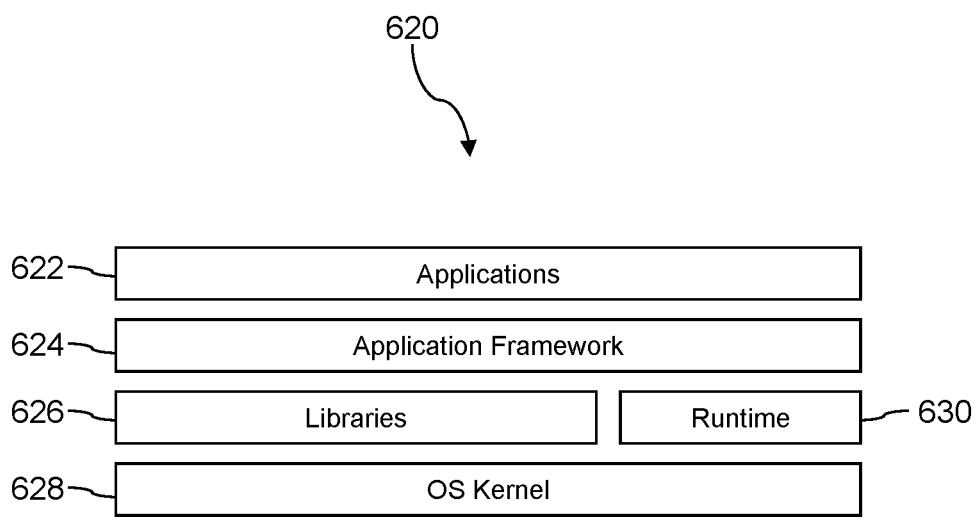
FIG. 9B is a block diagram of another software architecture according to an embodiment of the disclosure.

FIG. 9B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
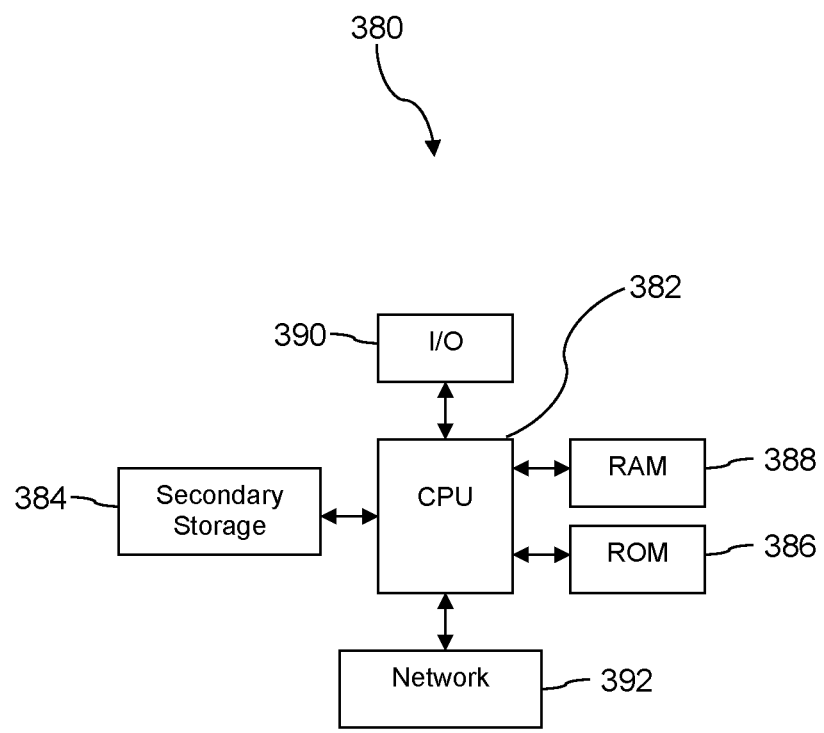
FIG. 10 is a block diagram of a computer system according to an embodiment of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing a media content package to a communication device, comprising:
    creating a library of media content artifacts, wherein the media content artifacts comprise applications, display wallpapers, favorites shortcuts and wherein each media content artifact in the library of media content artifacts is associated with a list of attributes;
    receiving a request for media content by a media content provider application executing on a computer system from the communication device, wherein the request comprises device attributes;
    retrieving subscriber attributes by the media content provider application from a subscriber database, wherein the subscriber attributes comprise communication service plan attributes associated with the subscriber of the communication device and demographic attributes associated with the subscriber of the communication device;
    creating a manifest of media content artifacts by the media content provider application based on identifying alignment between at least some of the media content artifacts and the subscriber attributes and the device attributes, wherein the manifest of media content artifacts identifies a list of selected media content artifacts along with a location from which the communication device can retrieve the selected media content artifacts and identifies a retrieval priority of each of the selected media content artifacts; and
    sending the manifest of media content artifacts by the media content provider application to the communication device, whereby the communication device is enabled to retrieve the selected media content artifacts in a prioritized manner and install at least some of the selected media content artifacts in the communication device.

2. The method of claim 1, wherein the demographic attributes associated with the subscriber of the communication device comprise an age category of the subscriber and an interest category of the subscriber.

3. The method of claim 1, wherein the demographic attributes associated with the subscriber of the communication device comprise information about a residence location of the subscriber.

4. The method of claim 1, wherein the device attributes comprise information about a processor capability of the communication device, a memory capacity of the communication device, and a display capability of the communication device.

5. The method of claim 1, wherein the device attributes comprise information about media content artifacts installed on the communication device including identities of the media content artifacts and version identities of the media content artifacts.

6. The method of claim 1, wherein the retrieval priority identified by the manifest indicates a different maximum number of retry attempts for different ones of the media content artifacts identified in the manifest.

7. The method of claim 1, wherein the location from which the communication device can retrieve the selected media content artifacts includes a partition within the library of media content artifacts.

8. A mobile communication device, comprising:
    a processor;
    a non-transitory memory;
    a radio transceiver;
    a display; and
    a media content client application stored in the non-transitory memory that, when executed by the processor:
        sends a request for media content to a media content service via the radio transceiver,
        receives a manifest of media content artifacts via the radio transceiver from the media content service, wherein the manifest of media content artifacts identifies a plurality of media content artifacts, locations at which to retrieve each of the plurality of media content artifacts, and a priority associated with each of the plurality of media content artifacts,
        for each of the plurality of media content artifacts, attempts to retrieve one of the plurality of media content artifacts based on a retry schedule defined by the priority associated with the one of the plurality of media content artifacts, and
        installs at least some of the plurality of media content artifacts into the non-transitory memory, whereby the processor presents media content on the display.

9. The mobile communication device of claim 8, wherein the request for media content sent to the media content service comprises information about the processor, about the non-transitory memory, and about the display.

10. The mobile communication device of claim 8, wherein the request for media content sent to the media content service comprises information about media content artifacts already stored in the non-transitory memory.

11. The mobile communication device of claim 8, wherein presenting media content on the display comprises presenting a list of favorites in a browser screen.

12. The mobile communication device of claim 8, wherein presenting media content on the display comprises presenting a wallpaper on the display.

13. The mobile communication device of claim 8, where the processor further sounds media content through a speaker of the mobile communication device.

14. The mobile communication device of claim 8, wherein the mobile communication device is one of a smart phone, a wearable computer, a headset computer, a laptop computer, a tablet computer, or a notebook computer.

15. A method of providing a media content package to a communication device, comprising:

storing a first plurality of media content artifacts associated with a first content provider in a first partition in a storage facility;

storing a second plurality of media content artifacts associated with a second content provider in a second partition in the storage facility, wherein the first plurality and the second plurality of media content artifacts comprise applications, display wallpapers, and favorites shortcuts and wherein each media content artifact is associated with a list of attributes;

receiving a request for media content by a media content provider application executing on a computer system from the communication device, wherein the request comprises device attributes;

retrieving subscriber attributes by the media content provider application from a subscriber database, wherein the subscriber attributes comprise communication service plan attributes associated with the subscriber of the communication device and demographic attributes associated with the subscriber of the communication device;

creating a manifest of media content artifacts by the media content provider application based on identifying alignment between at least some of the attributes associated with the first and second plurality of media content artifacts and the subscriber attributes and the device attributes, wherein the manifest of media content artifacts identifies a list of selected media content artifacts along with a location in either the first partition or the second partition of the storage facility from which the communication device can retrieve the selected media content artifacts and identifies a retrieval priority of each of the selected media content artifacts; and sending the manifest of media content artifacts by the media content provider application to the communication device, whereby the communication device is enabled to retrieve the selected media content artifacts in a prioritized manner and install at least some of the selected media content artifacts in the communication device.

16. The method of claim 15, wherein a rules executor application executing on the computer system defines the manifest of media content artifacts based on the device attributes and based on the subscriber attributes and based on rules defined within a media content service and provides the manifest to the media content provider application, wherein the media content provider application and the rules executor application are part of the media content service.

17. The method of claim 16, wherein the media content service comprises a media content inventory and rules data store that stores identities of media content artifacts, wherein each identity of a media content artifact is associated with a location of a corresponding media content artifact in the storage facility, with a retrieval priority associated with downloading the corresponding media content artifact, and with a rule to be executed by the rules executor application.

18. The method of claim 17, further comprising storing identities of media content artifacts, attributes associated to the identities of media content artifacts, retrieval priorities associated to the identities of media content artifacts, and rules associated to the identities of media content artifacts in the media content inventory and rules data store by a media content manager application executing on the computer system.

19. The method of claim 15, wherein the media content artifacts comprise ring tones, power-on videos, power-off videos, and logos.

20. The method of claim 15, wherein the communication device is a smart phone, a wearable computer, a headset computer, a laptop computer, a tablet computer, or a notebook computer.

* * * * *